(12) United States Patent
Jammu et al.

(10) Patent No.: US 8,126,679 B2
(45) Date of Patent: Feb. 28, 2012

(54) AUTOMATIC REMOTE MONITORING AND DIAGNOSTICS SYSTEM

(75) Inventors: Vinay Bhaskar Jammu, Bangalore (IN); Catherine Mary Graichen, Malta, NY (US); Arnim Smolenski, Lingen (DE); Mahesh Amritlal Morjaria, Marietta, GA (US); Soumen De, Bangalore (IN); Aurélie Bureau, Colombiers (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/726,166

(22) Filed: Mar. 17, 2010

(65) Prior Publication Data

US 2010/0235142 A1 Sep. 16, 2010

Related U.S. Application Data

(62) Division of application No. 11/260,324, filed on Oct. 27, 2005, now Pat. No. 7,720,639.

(51) Int. Cl.
*G06F 11/30* (2006.01)

(52) U.S. Cl. ....................................................... 702/183

(58) Field of Classification Search .................... 702/183
See application file for complete search history.

(56) References Cited

U.S. PATENT DOCUMENTS

| | | | |
|---|---|---|---|
| 4,095,094 A | 6/1978 | Struger et al. | |
| 4,774,814 A | 10/1988 | Yingst et al. | |
| 4,835,459 A | 5/1989 | Hamlin et al. | |
| 4,851,985 A | 7/1989 | Burror et al. | |
| 4,897,777 A | 1/1990 | Janke et al. | |
| 4,942,513 A | 7/1990 | Sakano et al. | |
| 4,996,688 A | 2/1991 | Byers et al. | |
| 5,065,314 A | 11/1991 | Maskovyak | |
| 5,100,702 A | 3/1992 | Maeda et al. | |
| 5,142,469 A | 8/1992 | Weisenborn | |
| 5,592,373 A | 1/1997 | Barthel et al. | |
| 5,754,451 A * | 5/1998 | Williams ...................... | 702/185 |
| 5,828,178 A | 10/1998 | York et al. | |

(Continued)

FOREIGN PATENT DOCUMENTS

CN 1294467 A 5/2001

(Continued)

OTHER PUBLICATIONS

European Search Report regarding Application No. 07100153, Oct. 20, 2009, 7 pgs.

(Continued)

*Primary Examiner* — Cindy H Khuu
(74) *Attorney, Agent, or Firm* — James McGinness, Esq.; Armstrong Teasdale LLP

(57) ABSTRACT

A Monitoring and Diagnostics System is provided, which includes a monitoring unit and a monitored unit remotely located from the monitoring unit. The System also includes communication means between the monitoring unit and the monitored unit. The monitored unit includes data acquisition means for providing fault data of the monitored unit and the communication means are adapted to communicate the fault data from the monitored unit to the monitoring unit. The monitoring unit includes a rules engine having a set of expert rules for analyzing the information contained in the fault data and being adapted to deduce diagnostics information from the rules and from the information. In addition, a communication method for communicating between a first Programmable Logic Controller and a second Programmable Logic Controller or a central unit is provided, in which a description file is provided.

16 Claims, 3 Drawing Sheets

U.S. PATENT DOCUMENTS

| | | | |
|---|---|---|---|
| RE36,263 E | 8/1999 | Janke et al. | |
| 6,438,633 B1 | 8/2002 | Stone | |
| 6,487,478 B1* | 11/2002 | Azzaro et al. | 701/24 |
| 6,963,197 B1 | 11/2005 | Feight et al. | |
| 7,194,325 B2 | 3/2007 | Lee et al. | |
| 2002/0029097 A1* | 3/2002 | Pionzio et al. | 700/286 |
| 2002/0156838 A1 | 10/2002 | Batke et al. | |
| 2002/0199172 A1 | 12/2002 | Bunnell | |
| 2004/0095237 A1 | 5/2004 | Chen et al. | |
| 2004/0151578 A1* | 8/2004 | Wobben | 415/4.1 |
| 2005/0127680 A1 | 6/2005 | Lof et al. | |
| 2005/0137465 A1* | 6/2005 | Cuddihy et al. | 600/300 |
| 2005/0139728 A1* | 6/2005 | Jammu et al. | 246/167 R |
| 2006/0229777 A1* | 10/2006 | Hudson et al. | 701/29 |
| 2006/0259160 A1 | 11/2006 | Hood et al. | |
| 2007/0067458 A1 | 3/2007 | Chand | |

FOREIGN PATENT DOCUMENTS

| | | |
|---|---|---|
| CN | 1490969 A | 4/2004 |
| EP | 1518942 A1 | 3/2005 |
| WO | 02095088 A2 | 11/2002 |

OTHER PUBLICATIONS

N M Uvarova et al, Study of Thermal Decomposition of Acetylacetonates of Platinum (IV) and Gold (III) Methyl Derivatives, 1976, 3 pages.

CN Office Action; Patent Application No. 200610163905.6; dated Mar. 30, 2011; 6 pages.

Chinese Office Action issued in connection with CN Patent Application No. 200610163905.6, Aug. 30, 2011.

* cited by examiner

AUTOMATIC REMOTE MONITORING AND DIAGNOSTICS SYSTEM

CROSS REFERENCE TO RELATED APPLICATIONS

This application is a divisional of U.S. patent application Ser. No. 11/260,324, filed Oct. 27, 2005, and issued as U.S. Pat. No. 7,720,639, which is hereby incorporated by reference in its entirety and is assigned to the assignee of the present invention.

BACKGROUND OF THE INVENTION

This invention relates generally to a Monitoring and Diagnostics system and, more particularly, to a communication method, in particular to a communication method for communicating between a Programmable Logic Controller and a central unit.

Monitoring and Diagnostics systems (M&D systems) are commonly used whenever apparatuses need to be monitored. Such systems are particularly useful if a plurality of apparatuses that are spread over an extended area or that are otherwise difficult or inconvenient to access need to be monitored (Remote Monitoring and Diagnostics systems, or RM&D systems). For example, given the geographical spread of wind turbines, it is usually not feasible for an operator to be at a given wind turbine. Further examples include solar panels, medical apparatuses, elevators, locomotives, traffic control systems, and the like. M&D systems include sensors in the apparatuses that indicate faults and communication lines to transmit the sensor signals to a central location, where a human operator is able to analyze the signals and take appropriate actions.

One issue regarding M&D systems is the response time, i.e. the time span between the fault event and the initiation of appropriate actions. It is desired to have short response times, because, for example, apparatus faults can lead to apparatus unavailability, further damage to the apparatus, or to an increased risk (e.g. in the case of medical equipment or of traffic control systems).

In M&D systems, the response time depends on the availability of a human operator. For example, if a wind turbine connected to a M&D system faults, it usually stops its operation until an operator is able to analyze its condition, to establish that a reset of the turbine is feasible and to perform the reset, During that period, the turbine is unavailable and does not produce energy. To improve the response time, an operator needs to be available when the turbine faults. However, permanent operator availability is costly, and is still not a guarantee for a short response time, e.g. in the case of simultaneous faults in multiple apparatuses.

Communication methods between Programmable Logic Controllers and other systems have been using, in most cases, static protocols, i.e. protocols, in which data items are transmitted according to a predetermined structure. These protocols are hard to extend. For example, the positions at which information could be found and also the type and length of each data point are usually the same and have no dynamic aspect.

Protocols allowing for a more flexible data transmission from or to Programmable Logic Controllers are also known, for example the protocols according to the norms IEC 60870-5-104 and JEC 61850. These protocols allow transmitting data along with information regarding the structure of the transmitted data. However, both the data and the information are transmitted in the same channel, whereby the performance of the protocol is degraded. Also, a clear distinction between raw data and information can be desirable e.g. for optional compatibility with respect to other static protocols.

BRIEF DESCRIPTION OF THE INVENTION

In one aspect A Monitoring and Diagnostics System, comprising:
a monitoring unit, a monitored unit, and communication means between said monitoring unit and said monitored unit, wherein said Monitoring and Diagnostics System is configured such that:
said monitored unit comprises data acquisition means for providing fault data of said monitored unit;
said communication means are adapted to communicate the fault data from said monitored unit to said monitoring unit; and
said monitoring unit comprises a reasoning engine comprising a diagnostics knowledge for analyzing the information contained in the fault data and being adapted to deduce diagnostics information from said diagnostics knowledge and from the information.

In another aspect a communication method for communicating between a first Programmable Logic controller and at least one of a second Programmable Logic controller and a central unit, comprising:
the first Programmable Logic Controller and the at least one of the second Programmable Logic Controller and the central unit communicate data items via a communication channel according to an essentially deterministic transfer structure;
the first Programmable Logic Controller and the at least one of the second Programmable Logic Controller and the central unit provides a separate description file containing a description of the information contained in the data items or in the sequence of data items.

DETAILED DESCRIPTION OF THE INVENTION

Figure 1:
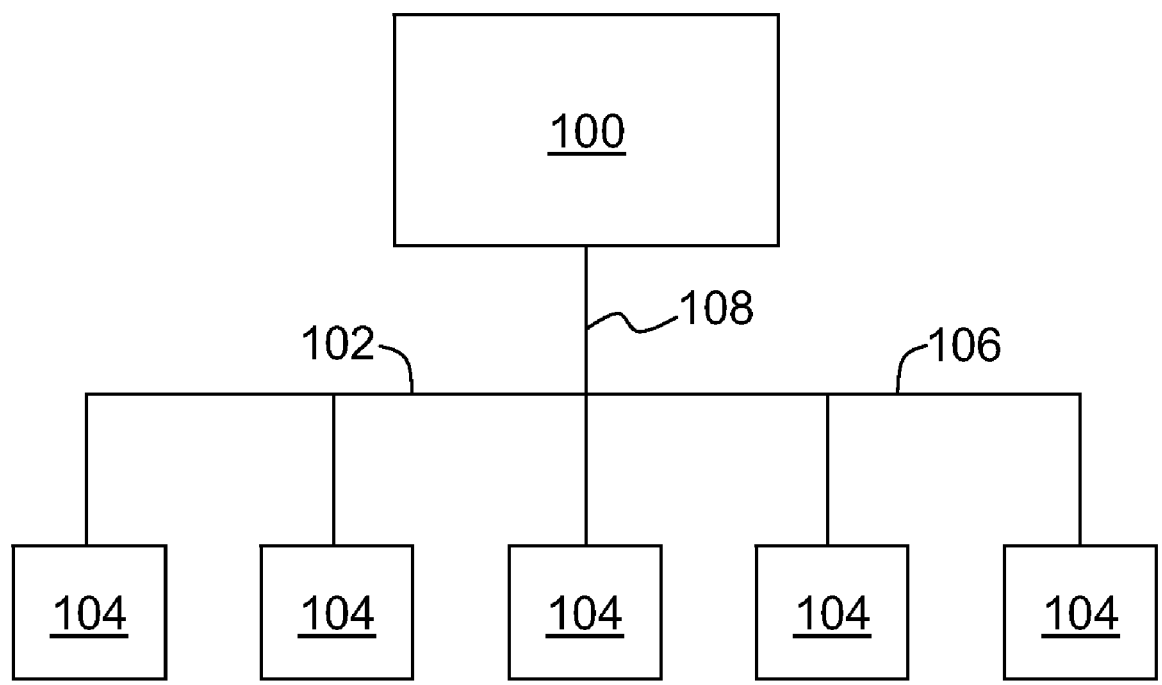
FIG. 1 is a schematic view of a Monitoring and Diagnostics system.

In view of the above, Monitoring and Diagnostics system is provided that includes, a monitoring unit and a monitored unit, and communication means between the monitoring unit and the monitored unit. The monitored unit includes data acquisition means for providing fault data of the monitored unit and the communication means are adapted to communicate the fault data from the monitored unit to the monitoring unit. The monitoring unit includes a reasoning engine having diagnostics knowledge for analyzing the information contained in the fault data and being adapted to deduce diagnostics information from said diagnostics knowledge and from the information. Thus, a system for the automated handling of faults in apparatuses, for example, in a plurality of remotely located apparatuses, through the use of diagnostics knowledge is provided by combining a Monitoring and Diagnostics system with a reasoning engine, such as e.g. a rule based expert analysis engine comprising diagnostics knowledge. Such reasoning engines are traditionally used in database applications, where they are used for analyzing complex sets of data and for deducing appropriate decisions. Examples include score card engines for bank credit decisions, or spell checking systems in word processors.

The Monitoring and Diagnostics system can also provide diagnostics information, i.e. information relating to the nature or the origin of a fault. The system can also provide suggestions on the next steps for diagnostics or repair of the apparatus. The reasoning engine includes means to analyze the fault data of the apparatus and to apply the diagnostics knowledge to determine a course of action. The diagnostics knowledge can be updated easily as the knowledge/expertise on connect fault procedures increases.

An advantage of the present invention is that the need of human local access and of human remote access to the apparatuses can be minimized. A further advantage is that a reduction of the response time is achievable. A further advantage is that cost efficiency is improved. A further advantage is that the consistency for the handling of apparatus faults is improved, because due to the diagnostics knowledge, the system goes through well-defined fault handling procedures and analysis steps.

In one aspect, the reasoning engine includes at least one element taken from the group consisting of Bayesian belief networks, causality engines, rules engines, decision trees, classification trees, simulation engines, neural networks, database comparisons, and combinations thereof. The diagnostics knowledge includes at least one element taken from the group consisting of Bayesian graphs, procedures, sets of expert rules, database entries, and combinations thereof. Additionally, the reasoning engine is adapted to analyze a cross-relation between a plurality of faults contained in the fault data, and the M&D system includes control means for controlling the settings or working parameters of the monitored unit. Further, the M&D system includes a database recording fault data and the diagnostics information for further use. Additionally, the M&D system includes means for updating the diagnostics knowledge and includes a plurality of monitored units. The reasoning engine is adapted to provide, depending on the information contained in the fault data, suggestions for possible next steps to be undertaken. The reasoning engine is further adapted to determine and initiate, depending on the information contained in the fault data, a course of action to be taken. The M&D system also includes cross-validation means for checking if the initiated course of action was successfully performed and the monitoring unit is remotely monitored from the monitored unit, i.e., for example, separate from the monitored unit, located at a distance farther than 10 m, 100 m, 1 km, or 10 km, or at a location that is difficult or inconvenient to access from the monitoring unit.

In one aspect, the monitored unit is a wind turbine, and one possible course of action to be taken is an automatic reset of the wind turbine. The communication means are such that the fault data to be communicated can be selected, e.g. by fault, by fault type, by monitored unit, or by a cluster of monitored units. The Monitoring and Diagnostics System comprises a monitoring unit and a monitored unit remotely located from the monitoring unit, and communication means between the monitoring unit and the monitored unit, whereby the monitored unit comprises data acquisition means for providing fault data of the monitored unit, the communication means are adapted to communicate the fault data from the monitored unit to the monitoring unit, and the monitoring unit comprises a reasoning engine comprising diagnostics knowledge for analyzing the information contained in the fault data and being adapted to deduce diagnostics information from said diagnostics knowledge and from said information. Also, a communication method for communicating between a first Programmable Logic Controller and at least one of a second Programmable Logic Controller and a central unit is provided, in which a description file is provided.

A communication method for communicating between a first Programmable Logic Controller and at least one of a second Programmable Logic Controller and a central unit is provided, which includes the first Programmable Logic Controller and at least one of the second Programmable Logic Controller and the central unit communicate data items via a communication channel according to an essentially deterministic transfer structure. In addition, the first and the at least one of the second Programmable Logic Controller and the central unit provides a separate description file containing a description of the information contained in the data items or in the sequence of data items.

The description file e.g., an XML File, allows a particular data point corresponding to a particular information to locate in the communication sequence. In a further aspect of the invention, the description file is an XML file. In the static communication channel, or according to the transfer structure, the data items are transmitted in a predetermined sequence, so that the information is transmitted in a fixed order in the sequence of data items. In a further aspect of the invention, the data items in the communication channel, or according to the transfer structure, contain no describing elements. In a further aspect, the description file is transmitted between the first Programmable Logic Controller and at least one of the second Programmable Logic Controller and the central unit cyclically with a specifiable cycle. In a further aspect, the description file is transmitted between the first Programmable Logic Controller and the at least one of the second Programmable Logic Controller and the central unit in response to a pre-defined event or condition.

According to an embodiment of the invention, the description file is transmitted, and then raw data is transmitted via the communication channel. Optionally, the raw data is transmitted periodically, whereas the description file is only transmitted once in a communication and describes the raw data of each period.

An advantage of this communication method is that the second Programmable Logic Controller or the central unit can be enabled to locate data provided by the first Programmable Logic Controller on its own, or vice versa. By means of the description file, it is possible to locate a particular information, or data point, and to know in what provided structure it could be read. Additionally, it is possible to locate the relevant data, i.e. the values, behind which stands a real supply of interest. In addition it is possible to transfer data to be utilized for an auto configuration. In one embodiment, the data and the information are transmitted in separate channels, leading to a good performance of the protocol. Also, a clear distinction between raw data and information allows for optional compatibility with respect to other protocols.

FIG. 1. illustrates an embodiment of a monitoring unit 100 connected via communication means 102 to a plurality of remotely located monitored units 104. As used herein, the term remote refers to any unit that is physically separated from the monitoring unit by more than a certain distance (e.g. more than 100 m, 1 km, or 10 km), or that is otherwise difficult or inconvenient to access directly. Alternatively, connection means 102 are divided into a network 106 for a cluster of the monitored units and a connection 108 between network 106 and monitoring unit 100. The cluster of monitored units 100 may include one or several or all units, and several clusters may also be present. Network 106 is typically a local area network and communication means 102 uses, in some embodiments, dedicated connections, such as T1 lines, or dial-up modem connections, connections by cable, by optical fiber, by wireless connection, and other connection means. Communication means 102 also includes, in one embodiment, additional infrastructure elements, such as a network server, a router, etc. Typically, file transfer protocol (ftp) is used to move data files from one unit to another. However, Email, TCPIIP, I-JTTP and other protocols may be utilized as well.

Figure 2:
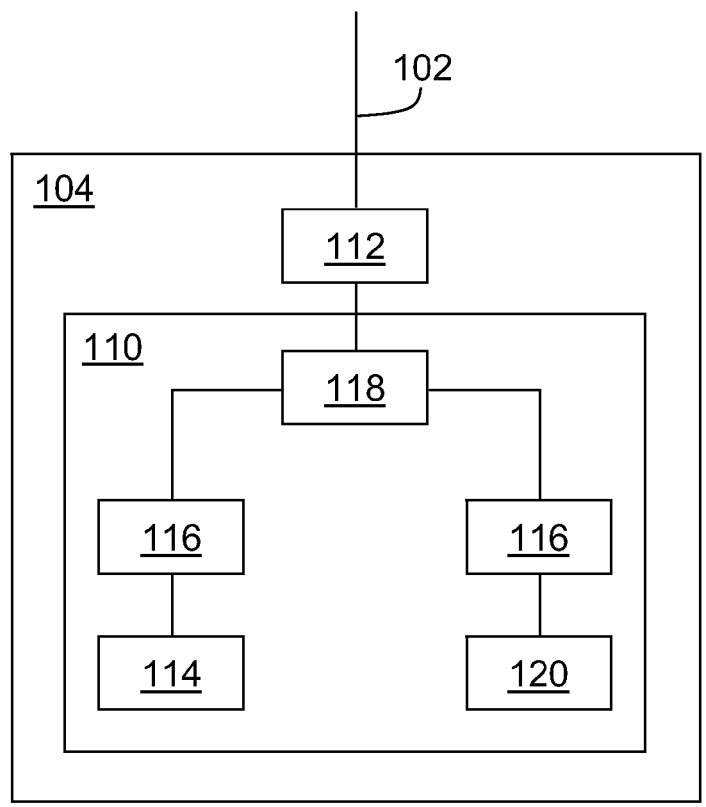
FIG. 2 is a schematic view of a monitored unit.

The monitored unit 104 is further illustrated in FIG. 2. It includes a system 110 for controlling monitored unit 104 and for providing fault data, which is connected to communication means 102 via a communication interface 112. The term fault data is intended to include data or messages that are only sent in the case of a fault event, and that may contain information on the nature of the fault. The term fault data, in one embodiment, also includes data or messages that are sent irrespective of whether a fault occurs or not, and that may contain information on the occurrence of a fault, and optionally on the nature of the fault. System 110 for controlling the monitored unit and for providing fault data includes at least one sensor 114 for measuring data from monitored unit 104, e.g. wind sensors, sensors for the mechanical operation of the unit, voltage sensors, current sensors, and/or any other sensor detecting data relevant for the functioning of monitored unit 104 from monitored unit 104 or from its environment. System 110 further comprises a data processing means 116, e.g. a Programmable Logic Controller, for processing the data measured in sensors 114, and a central unit 118 for controlling functions of monitored unit 104, Sensors 114 are connected to data processing means 116, which is connected to central unit 118, which in turn is connected to communication interface 112. In a further embodiment, system 110 includes controlling means 120 for controlling or influencing monitored unit 104, e.g. a reset mechanism, a mechanism for the controlled shutdown of monitored unit 104, a brake, a switch for activating a replacement unit, or a device for the controlled reduction of activity of the monitored unit 104. In one embodiment controlling means 120 are connected to central unit 118, via data processing means 116, e.g. a Programmable Logic Controller. Data processing means 116 for sensors 114 and data processing means 116 for controlling means 120, in one embodiment, are two separate units as shown in Fig. Alternatively they are the same unit.

Figure 3:
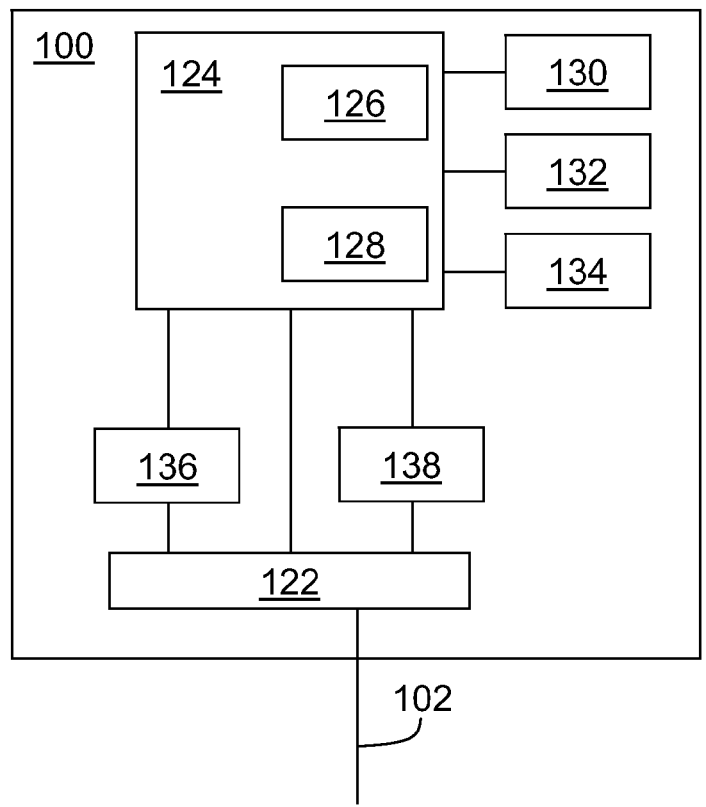
FIG. 3 is a schematic view of a monitoring unit.

FIG. 3 illustrates monitoring unit 100. including a computer or a network of computers. Monitoring unit 100 includes a communication interface 122 connected to communication means 102 for receiving fault data from monitored units 104 and for communicating with monitored units 104. In one embodiment, communication interface 122 includes at least one of a modem, a router, and a network card. Monitoring unit 104 further includes a reasoning engine 124, e.g. a rules engine, for analyzing the fault data and for providing diagnostics information, and optionally for suggesting possible next steps to be undertaken and/or for initiating automatic remedial actions in monitored unit 104, such as a reset, a controlled shutdown, braking, the activation of a replacement unit, or a controlled reduction of activity. In one embodiment, reasoning engine 124 includes a diagnostics knowledge 126, e.g. a set of expert rules, and a processor 128. Reasoning engine 124 is further connected to an optional input device 130, an output device 132, and an optional services database 134.

Reasoning engine 124 is connected to communications interface 122 either directly or via an optional parsing means 136 for analyzing the incoming fault data and for generating from the fault data values that can be read by reasoning engine 124. The connection further optionally comprises a processor 138 for sending out signals to monitored unit 104, e.g. for transmitting commands for initiating remedial actions.

What follows is a description of the operation of the components shown in FIGS. 1-3. During normal operation of monitored unit 104, sensors 114 regularly monitor the operation of unit 104. The data is processed by data processing means 116, and information is transmitted to central unit 118 for controlling monitored unit 104. Here, the data is further processed, and fault data is generated. The fault data is then transmitted, via communication interface 112 of the monitored unit 104, communication means 102, and communication interface 122 of monitoring unit 100, to monitoring unit 100. The fault data may then be further processed by parsing means 136 and is transmitted to reasoning engine 124. There, processor 128 analyses the fault data according to diagnostics knowledge 126.

As a result of the analysis, diagnostics information is generated and outputted on output device 132. Diagnostics information includes information regarding the origin or the nature of a fault, further details regarding the fault, e.g. time, location, severity, duration, summary information regarding the fault, and the like. Optionally, a suggestion for next steps can be generated.

Further, reasoning engine 124 may also initiate an appropriate automatic action of monitored unit 104. In this case, the request for this action is sent back to monitored unit 104. Hereby, the request is optionally processed by a processor 138 for sending out signals, and is then sent out to monitored unit 104 via communication interface 122 and communications means 102. In monitored unit 104, the request signal is received, via communication interface 112, by central unit 118. If appropriate, it is transmitted to data processing means 116, and to controlling means 120 for executing the request.

In one embodiment, for reasoning expert engine 124 to complete the analysis, additional data beyond the fault itself is required. This data, in one embodiment, includes other faults that occur within a few seconds, parameter settings on monitored unit 104, environmental conditions, e.g. wind speed and temperature, whether all fault messages are being sent, historical fault information, and other data. In an embodiment of the invention, system 110 for controlling monitored unit 104 and for providing fault data collects the data to transmit to monitoring unit 100, or to the centralized system. Choosing the data to transmit depends on communication costs and ability to diagnose the specific fault. When communication means 102 provide high-speed connectivity, the desire is to send a large amount of data. However, communication means 102, in one embodiment, also contains communications devices, such as dial-up modems, and the transmission speeds may vary. One aspect of the invention is to provide configuration data to system 110 for controlling monitored unit 104 and for providing fault data that allows the data to be selected by fault and by monitored unit 104. For example, the communication time and cost can be adjusted to the respective needs while still achieving the desired availability goals with respect to the fault data and the appropriate reaction by monitoring unit 100.

For example, to address the potential that monitored unit 104 has changed state between the sending of a fault message to monitoring unit 100 and the receiving of a request for taking appropriate action from monitoring unit 100, in this embodiment large amounts of data are not communicated. Instead, system 110 for controlling monitored unit 104 and for providing fault data will compare the current state of monitored unit 104 to the state when the fault message was sent. If the condition is the same, then system 110 for controlling the monitored unit 104 and for providing fault data processes the request. In both circumstances, a feed back message is sent to the monitoring unit 100 for confirmation. The state of monitored unit 104 is defined as changed if new faults have occurred since the original message, or if the monitored unit was subject to other requests.

The data retrieved from monitored unit 104 may arrive in several forms. Thus, optional parsing means 136 in this invention may interpret the data retrieved from monitored unit 104 and may construct the variable input in a suitable form for reasoning engine 124 or for diagnostics knowledge 126. In one embodiment, the input to this component is also configurable, particularly for retrieving the expected settings of monitored unit 104 and limits on historical fault frequency. Parsing component 136, reasoning engine 124, and diagnostics knowledge 126 are designed to work together. While specific decisions may be made to implement some calculations in parse component 136, other embodiments implement these within the other components.

Reasoning engine 124 includes a compute processor 128 where a software program that interprets diagnostics knowledge 126 and the input variables for the rule executed. Reasoning engine 124, in one embodiment, creates advisory messages that represent diagnostics information via output device 132. Reasoning engine 124, in another embodiment, also creates suggestions for further steps, or actions that should be followed. The actions include, in one embodiment, service actions to be performed by, at least one of a remote service engineer and an on-site service engineer, and/or actions to be handled automatically by system 110 for controlling monitored unit 104 and for providing fault data. Automatic actions are sent out via the optional processor for sending out signals 138, to the appropriate monitored unit 104 as described above.

Specifically, reasoning engine 124 is, in one embodiment, a rules engine, or rule-based processor, or rule system, having a set of expert rules as diagnostics knowledge 126. Then, the rules contain the business logic for handling each fault. Preferably, the rule design is robust so that even when input data is incomplete, the rules allow for the creation of appropriate diagnostic recommendations. For instance, with missing inputs, the diagnostic advisory text may state that certain data is incomplete or unavailable, so that a definite recommendation cannot be given, and that the engineers should retrieve the data manually and continue to follow the fault procedures. If the data cannot be retrieved from monitored unit 104 (for instance if fault history is no longer available), then the output could be that the engineer must retrieve the data from other sources or in some other manner to determine the appropriate action.

Typically, the rule style for each fault is similar, although the specific variables that must be checked vary. As a result each rule is typically implemented manually. A test procedure to validate that the rule has been implemented correctly is typically utilized. This test procedure includes, in one embodiment, checking the result of the rules with all combinations of expected input variables. Another aspect of the rules is that multiple faults can be analyzed simultaneously. Since a fault can trigger other faults, it is advisable that all the current active faults be assessed. For example, in one embodiment a certain action is performed if this action is not in conflict with any of the detected faults. Therefore, the rules are generally constructed so that although each fault is assessed independently, if any condition prevents an event for one fault of the active faults, no request will be created for the specific event.

As a second example of a reasoning engine 124, a Bayesian network is employed in the Monitoring and Diagnostics system, in which, diagnostics knowledge 126 is represented as a Bayesian graph. For further details on Bayesian networks, refer to *Finn V. Jensen, Introduction to Bayesian Networks* (*Springer* 1996).

Further examples for reasoning engine 124 include causality engines, rules engines, decision trees, classification trees, simulation engines such as Monte-Carlo methods and simulations of underlying physical models for the monitored unit, neural networks, database comparisons, and combinations thereof. Further examples for a representation of diagnostics knowledge 126 can then be procedures, sets of expert rules, database entries, or combinations thereof.

Reasoning engine 124, in one embodiment, uses an advanced pattern of fault data. For example, the occurrence of a predetermined number of faults in a given turbine and in a predetermined time interval. The faults may further be filtered or weighted by fault type, by time, by a correlation with other faults, or by other factors. In this manner, a cross-relation between a plurality of faults can be analyzed and exploited for diagnostic purposes.

Diagnostics knowledge 126 may be updated as the knowledge expertise on correct fault procedures increases. The updating, in one embodiment, is performed automatically via machine learning, e.g. in the context of neuronal networks or Bayesian networks. Alternatively, the updating is performed manually, e.g. by updating the expert rules in a rules engine.

Optional service database 132 contains the record of the fault and the follow-up corrective actions for maintaining history and audit trial. It is physically composed of several tables in at least one true database instance. This data is used to document what has happened on the system. It may also be used interactively for case management, although many other features would be utilized for a case handling system. The database, in one embodiment, provides an audit trail of the steps of the M&D process for debugging purposes and historical reporting.

In accordance with one embodiment, monitored unit 104 includes a wind turbine. A possible remedial action in the case of turbine faults is a reset, which may be initiated automatically via processor 138 of monitoring unit 100 for sending out signals, and is performed by controlling means 120, which in this embodiment includes a reset mechanism.

The remedial actions in a turbine include a reset of the turbine. After the reset and an optional startup phase, the turbine returns to normal operation. The reset is handled automatically by the M&D system components. Other possible actions include service actions to be taken by a remote service engineer or by an on-site service engineer.

Figure 4:
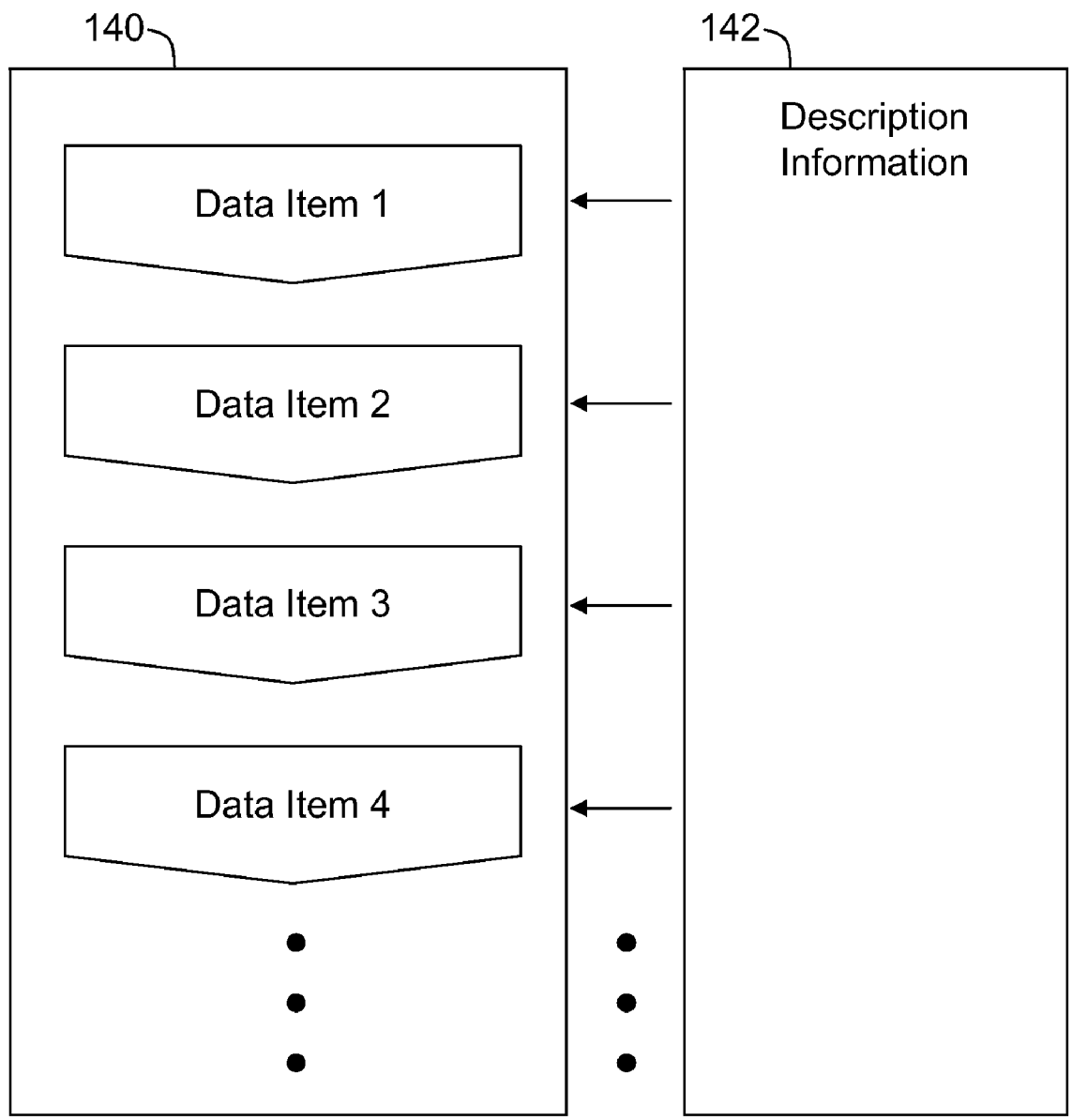
FIG. 4 illustrates a communication method between a Programmable Logic Controller and a central unit.

FIG. 4 illustrates a communication method according to a further embodiment of the invention. The method is used for communication between central unit 118 and Programmable Logic Controller 116 in monitored unit 104, or between two Programmable Logic Controllers 116 in monitored unit 104. Also, the method is used in Wind Farm Management Control Systems. However, the above are solely illustrative examples only and in no way limit the scope of the invention.

Central unit 118 and Programmable Logic Controller 116 are connected via a station bus, to which various other devices are optionally connected. In addition, the components are connected via an Ethernet or via switched Ethernet technology, or via a similar technology. The connection includes an interface for configuration tools for central unit 118 and/or for Programmable Logic Controller 116. The connection uses at least one of copper lines, consist of optical fibers, wireless LAN technology, and other connection means. The connection alternatively includes additional infrastructure elements, such as a network server, a router, a switch, etc.

The communication method, or communication protocol, uses a communication channel 140 for transmitting data items, or data elements, or data points, according to an essentially static or deterministic transfer structure. In addition, it uses a description file 142 for describing the information in static communication channel 140.

An essentially deterministic transfer structure governs the transfer of data items according to a predetermined set of static rules. For example, the data items are transmitted in a predetermined sequence, so that the information is transmitted in a fixed order in the sequence of data items. In particular, this example includes sequences, in which the order of data items is fixed, so that in each communication, the position at which a given information can be found is the same in the sequence of data items. However, an essentially deterministic transfer structure also includes variations of such sequences of fixed order, in which the length of a certain set of data items is variable according to predetermined rules. Alternatively, the set of data items may be inserted or omitted according to predetermined rules, or in which one of a list of several sequences of data items is selected for a part of the communication depending on some predetermined condition.

Such predetermined rules are determined in the firmware of Programmable Logic Controller 116, and/or are determined at the beginning of each communication, and/or are examples for communication protocols that implement an essentially deterministic transfer structure including signal oriented protocols, according to which data items are transmitted without any description elements, and object oriented protocols, according to which data items are transmitted with description elements. Hereby, the description elements can come in the form of necessary or optional attributes.

A data item of communication channel 140 essentially comprises a certain value to be transmitted. However, in one embodiment, a data item also includes other parameters related to the transmitted value, such as a system ID, a data item ID, a data type indicator (e.g. integer, floating point, array, optionally including an array length in the latter case), a timestamp, a quality indicator, etc).

In addition to communication channel 140, a separate description file 142 is provided, which describes the information in static communication channel 140. The description file generally provides information on how the sequence of data items in static communication channel 140 is organized, and/or on the information content of data items in static communication channel 140. Examples for description elements are an indicator indicating which data items are of relevance in a particular situation, which data items merely contain default values or checksums or the like, which data items contain a certain kind of physical or technical information, or information regarding the communication structure of communication channel 140.

In some situations, this latter information introduces an element of flexibility into the communication, since central unit 118 may interpret incoming data according to the description file, and therefore the communication may not be limited to one specific protocol, e.g. in the case that Programmable Logic Controller 116 is replaced or updated. At the same time, compatibility with respect to existing protocols is maintained.

Also, a part of the possible parameters of the data item (system ID, etc.) is contained in description file 142 and omitted in static communication channel 140. An advantage of this procedure is that the description file is transmitted only once during a communication, whereas a given sequence of data items is transmitted periodically. Therefore, the amount of data to transmit is reduced if parameters that do not change from period to period are included in description file 142 and are omitted from static channel 140.

Description file 142 is typically transmitted before data items are sent via static communications channel 140. Optionally, the description file is transmitted cyclically with a specifiable regular or irregular cyclus. The length of the cyclus is, in one embodiment, given in terms of temporal duration, the amount of transmitted data items, the count of other events, or of a combination thereof. Also, the description file is optionally transmitted cyclically, i.e. in response to pre-determined or specifiable events or conditions. Such events or conditions include, for example, initialization of central unit 118 or of Programmable Logic Controller 116, setup of a communication between two units or to a third unit; request or necessity for refreshing the data description; change of the data description or of the protocol in a transmitting unit (e.g. in the Programmable Logic Controller 116); and change of the data description or of the protocol in a receiving unit (e.g. in central unit 118).

It is to be understood that although the present invention has been described with regard to various specific embodiments thereof, other embodiments and variants may occur to those skilled in the art, which are within the scope and spirit of the invention, and such other embodiments and variants are intended to be covered by the following claims.

What is claimed is:

1. A Monitoring and Diagnostics System, comprising:
   a monitored unit comprising a wind turbine including at least one sensor configured to measure fault data of said monitored unit;
   a network; and
   a monitoring unit coupled to said monitored unit via said network, said monitoring unit configured to receive the fault data via said network, said monitoring unit comprising a reasoning engine comprising a diagnostics knowledge, said reasoning engine configured to:
   analyze the fault data and deduce diagnostics information from said diagnostics knowledge and based on the fault data;
   provide suggestions for possible next steps to be undertaken based on the diagnostics information; and
   determine and initiate a course of action to be taken on said monitored unit based on the information contained in the fault data.

2. A Monitoring and Diagnostics System according to claim 1 wherein the reasoning engine comprises at least one of the following elements: Bayesian belief networks, causality engines, rules engines, causal trees, decision trees, classification trees, simulation engines, neural networks, and database comparisons.

3. A Monitoring and Diagnostics System according to claim 1 wherein said diagnostics knowledge comprises at least one of the following elements: Bayesian graphs, procedures, sets of expert rules, causal or decision tree databases, and other databases.

4. A Monitoring and Diagnostics System according to claim 1 wherein said reasoning engine is adapted to analyze a cross-relation between a plurality of faults contained in the fault data.

5. A Monitoring and Diagnostics System according to claim 1 wherein said monitored unit further comprises a central unit configured to control said monitored unit.

6. A Monitoring and Diagnostics System according to claim 1, further comprising a database configured to store the fault data and the diagnostics information.

7. A Monitoring and Diagnostics System according to claim 1 wherein said reasoning engine is configured to update said diagnostics knowledge.

8. A Monitoring and Diagnostics System according to claim 1 wherein said monitored unit comprises a plurality of monitored units.

9. A Monitoring and Diagnostics System according to claim 1, further comprising an optional service database configured to store the initiated course of action and whether the course of action was successfully performed.

10. A Monitoring and Diagnostics System according to claim 1 wherein said monitoring unit is remotely located from said monitored unit.

11. A Monitoring and Diagnostics System according to claim 1 wherein one possible course of action to be taken is an automatic reset of the wind turbine.

12. A Monitoring and Diagnostics System according to claim 1 wherein the fault data is selectable by at least one of fault, fault type, monitored unit, and a cluster of monitored units.

13. A method for monitoring a unit using a Monitoring and Diagnostics System, said method comprising:
 coupling a monitoring unit to a monitored unit via a network, the monitored unit comprising a wind turbine, the monitoring unit including a reasoning engine, the reasoning engine including a processor and diagnostics knowledge;
 receiving, by the monitoring unit, fault data from the monitored unit via the network;
 analyzing information contained in the fault data using the processor;
 determining, by the reasoning engine, diagnostics information from the information using the diagnostics knowledge;
 providing, by the reasoning engine, suggestions for possible next steps to be undertaken based on the diagnostics information; and
 determining and initiating, by the reasoning engine, a course of action to be taken on the monitored unit based on the information contained in the fault data.

14. A monitoring unit, comprising:
 a communication interface configured to receive fault data from a remotely located wind turbine via a communication means; and
 a reasoning engine configured to:
  analyze the fault data;
  determine a remedial action to be taken on the wind turbine based on the information contained in the fault data; and
  initiate the remedial action.

15. A monitoring unit according to claim 14 further comprising a parsing means configured to analyze the fault data and generate fault data values based on the fault data, said reasoning engine configured to analyze the fault data values.

16. A monitoring unit according to claim 14 wherein said reasoning engine is further configured to generate at least one suggested next step to be undertaken for the wind turbine based on the fault data.

* * * * *